United States Patent
Carriker

[11] 3,900,749
[45] Aug. 19, 1975

[54] PERMANENT MAGNET GENERATOR
[75] Inventor: Roy C. Carriker, Lancaster, Pa.
[73] Assignee: HMW Industries, Inc., Lancaster, Pa.
[22] Filed: Apr. 2, 1974
[21] Appl. No.: 457,163

[52] U.S. Cl. .................. 310/156; 310/168
[51] Int. Cl. .......................... H02k 21/12
[58] Field of Search .......... 310/156, 168; 335/302

[56] References Cited
UNITED STATES PATENTS

| | | | |
|---|---|---|---|
| 3,209,185 | 9/1965 | Draper | 310/156 X |
| 3,436,570 | 4/1969 | Engels | 310/156 X |
| 3,540,945 | 11/1970 | Strnat et al. | 335/302 UX |
| 3,558,372 | 1/1971 | Becker | 335/302 UX |
| 3,677,947 | 7/1972 | Ray et al. | 335/302 X |

FOREIGN PATENTS OR APPLICATIONS

| | | | |
|---|---|---|---|
| 1,018,102 | 10/1957 | Germany | 310/156 |

*Primary Examiner*—G. Harris
*Attorney, Agent, or Firm*—LeBlanc & Shur

[57] ABSTRACT

Disclosed is a permanent magnet generator or alternator of very small size and compact construction. A rare earth - cobalt permanent magnet rotor is received within a core of unitary laminations. Surrounding a pair of opposed core legs are a pair of rectangular cores. The entire assembly is slipped into the cup of a two-piece plastic housing to provide a simple and easily assembled unit.

18 Claims, 11 Drawing Figures

PERMANENT MAGNET GENERATOR

This invention relates to a permanent magnet device capable of use as an elctrical generator or alternator and more particularly to a simplified and very small or miniature device of this type which produces substantial amounts of electrical power. Important features of the present invention in addition to small size and substantial power output is the provision of a device of relatively simplified and inexpensive construction and one which may be very simply assembled.

Electrical generators and alternators are well known to come in a variety of shapes and sizes. Efforts are constantly being made to reduce the size and cost of these devices but due to their relative complexity, attempts to miniaturize alternators and generators have met with only limited success.

The present invention is directed to a novel generator-alternator construction which makes possible a miniaturized device, i.e., one having dimensions on the order of one inch or less, while at the same time providing several watts of electrical output power at reasonable rotational speeds. In the preferred embodiment, the device is a two-pole unit and is formed with a permanent magnet rotor and a laminated core about which is wound a pair of rectangularly cross-sectioned electrical windings.

Important features of the present invention include the fact that the core laminations, electrical coils and rotor magnet are dimensioned to make optimum use of available space in the small sized device while at the same time permitting the device to be very simply assembled. Each core lamination is of unitary construction to reduce magnetic reluctance but at the same time it is constructed so that the electrical windings may be simply slipped into a stack of core laminations to overlie a pair of core poles formed by a pair of central posts of the core laminate. The permanent magnet of the rotor is constructed to slip between the coils of the assembled core and laminate construction so as to rotate between the core legs.

The electromagnetic assembly is housed in a two-piece case of suitable material such as electrically insulating plastic formed in the preferred embodiment from a cup and cover. The stacked core laminates and assembled coils are dropped into the cup portion of the case and the rotor with the permanent magnet attached is slipped inbetween the coils with one end passing through a bearing mounted on the case cup. The case cover with a second bearing carried by it is then slipped over the other end of the rotor shaft and the cover and cup are secured together to preferably form a sealed insulating housing.

Because of the small overall size of the device and the severe demagnetization environment in which the permanent magnet of the rotor operates, the permanent magnet must be made of a material having a high resistance to self-demagnetization. The device of this invention requires a permanent magnet material with a high coercive force ($H_c$) namely one of at least 6,000 oersteds. A magnet having properties suitable for use in this invention may be selected from the group of rare earth cobalts which are known to have a coercive force ($H_c$) in the range of from about 6,000 to 9,000 oersteds.

The generator-alternator of the present invention can be used in many applications and is particularly adapted for use in electrical instruments for driving electrical indicators of all types and for use in military fuzes.

It is therefore one object of the present invention to provide an improved miniature electromagnetic device which may be used as a generator or alternator.

Another object of the present invention is to provide a miniaturized generator-alternator having increased power output and a relatively simplified and inexpensive construction.

Another object of the present invention is to provide such a miniaturized device which makes optimum use of available space in the overall assembly.

Another object of the present invention is to provide a permanent magnet generator or rotor incorporating a laminated core having a minimum amount of magnetic reluctance.

Another object of the present invention is to provide a miniaturized generator or alternator which is very simple and easy to assemble.

Another object of the present invention is to provide a permanent magnet generator-alternator utilizing a high coercive force permanent magnet.

Another object of the present invention is to provide a simplified and completely sealed housing for a miniature generator-alternator.

These and further objects and advantages of the invention will be more apparent upon reference to the following specification, claims and appended drawings wherein:

Figure 1:
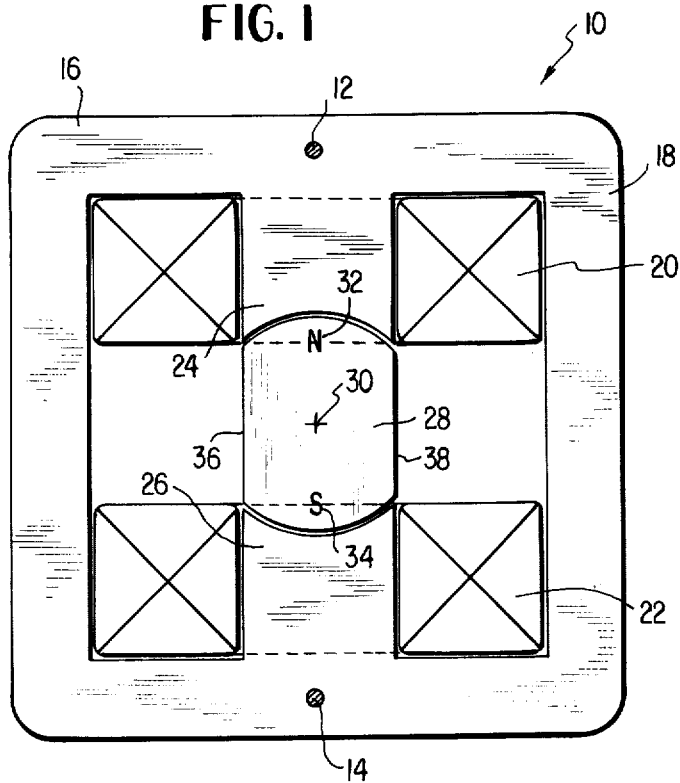
FIG. 1 is a cross-section through the electromagnetic assembly forming a part of the miniature generator-alternator constructed in accordance with the invention.

Referring to the drawings, FIG. 1 is a cross-section through the electromagnetic assembly generally indicated at 10 forming the interior portion of a device of this invention. It comprises a series of magnetic laminates such as iron which are held together by a pair of rods or pins 12 and 14 to form a magnetic core 16. The core forms a part of a stator assembly 18 which includes a pair of identical coils or windings 20 and 22.

Figure 3:
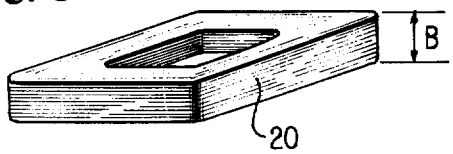
FIG. 3 is a perspective view of one of the rectangular cross-sectioned coils of FIG. 1.

These windings are wound around the two core legs 24 and 26 which are curved as illustrated to permit rotation of a rotor in the form of a permanent magnet 28 about an axis perpendicular to the plane of the paper in FIG. 1 as indicated by the X at 30. The rotor magnet is magnetized as shown in FIG. 1 to provide a north pole 32 and a south pole 34 and, while generally of circular cross-sectional configuration, the magnet is cut away to provide the two flat sides 36 and 38. One of the coils such as coil 20 is shown in perspective in FIG. 3 and it is understood that the other coil 22 is of identical construction.

Figure 2:
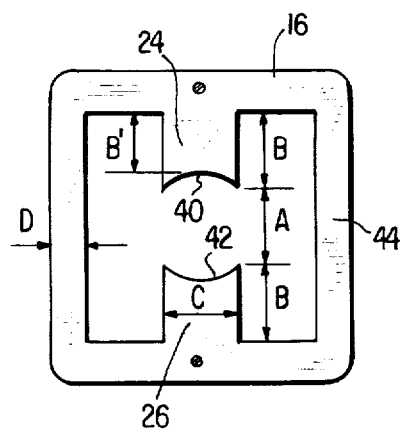
FIG. 2 is a plan view of one of the core laminations of FIG. 1 with key dimensions labeled for the purposes of explanation.

Important features of the present invention reside in the shape and dimensions of the individual laminations such as the lamination 16 of FIG. 2 in which the dimensions are labeled. In FIG. 2, the dimension A is the distance between the extreme outer tips of the legs 24 and 26, the dimension B is the distance from the base to the outer tip of a leg and the dimension C is the width of the leg. Dimension B' will be described below. The legs 24 and 26 of the laminate are mirror images of each other and are curved to provide the concave surfaces 40 and 42 which lie on a right circular cylinder having a radius just slightly greater than the radius of the curvature of permanent magnet 28 of FIG. 1 and centered about the rotational axis of the magnet.

Figure 4:
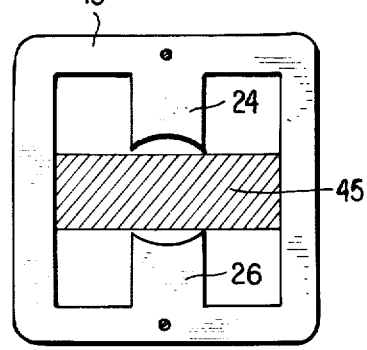
FIG. 4 shows the core laminate of FIG. 2 with the available entry space for insertion of one of the coils cross-hatched.

In the preferred embodiment, each of the laminates such as laminate 16 is of perfectly square configuration such that the distance $A = B = C$. The width D of the outer rectangular frame 44 of the laminate is equal to one-half of one of the dimensions A, B or C since the central posts or legs act as cores for the stator coils while the rectangular frame 44 serves as the magnetic backpath. The width D of the return backpath 44 should be at least half the width of one of the coil legs 24 or 26 to provide sufficient flux carrying capacity without saturating the backpath. Surrounding the legs 24 and 26 of the laminations are the rectangular cross-section coils 20 and 22 both having the configuration illustrated in FIG. 3. Coils of this configuration can easily be wound on simple coil winding equipment without the need for any complex winding techniques as required by many other generator constructions. The dimensions of the coils are such that each coil can be inserted into the opening depicted by the cross-hatching 45 in FIG. 4 and then be pushed up or down onto one of the center laminate legs, the second coil being positioned in the same manner. The final positions of the coils are shown in FIG. 1.

Figure 5:
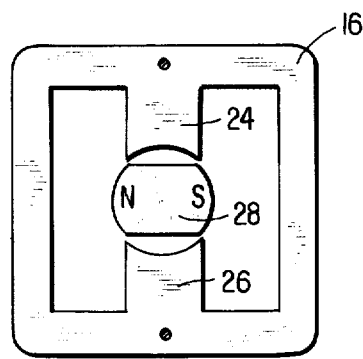
FIG. 5 shows a laminated core with the rotor magnet being inserted and the coils omitted for the sake of clarity.
Figure 6:
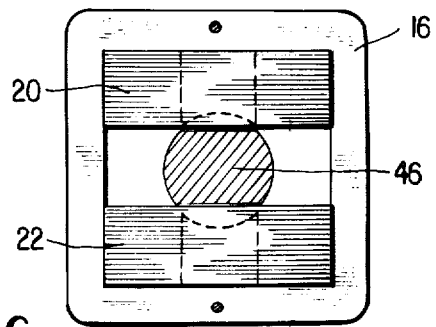
FIG. 6 shows in cross-hatching the space available for a bearing or bushing.

FIG. 5 shows how the permanent magnet 28 is inserted in a direction perpendicular to the plane of the paper in that FIGURE between the legs 24 and 26 of the laminations. The coils have been omitted in FIG. 5 for the sake of clarity but it is apparent that a clearance corresponding to the cross-hatched section 45 is provided for insertion of the permanent magnet rotor even after the coils have been placed around the legs 24 and 26. The cross hatch section 46 in FIG. 6 provides an area which is used as bearing support for the rotor shaft which mounts the permanent magnet 28.

The preferred construction is as previously described. However, a more ideal sinesoidal voltage waveform can be obtained from the device of the present invention if the magnet is completely cylindrical in cross-section, rather than having the two flat sides 36 and 38 of FIG. 1 limiting the width of the permanent magnet to the dimension C. The only change in construction required in the use of a cylindrical magnet is that the coils have a thickness B' as illustrated in FIG. 2, which is the distance from the base of the legs 22 and 24 to the center of the curved surfaces 40 and 42. This allows clearance between the coils for insertion of a cylindrical magnet once the coils are in place. The length of the overall device is governed by the number of laminations which are stacked to make the stator. These laminations are of a suitable high saturation magnetic material such as iron or the like and are electrially insulated from one another to reduce eddy current losses such as, for example, by coating one or both sides of each lamination with an insulating epoxy or other material. In the preferred construction, the laminations are stamped from an appropriate magnetic material which has been sprayed with an electrically insulated coating on one side.

Figure 7:
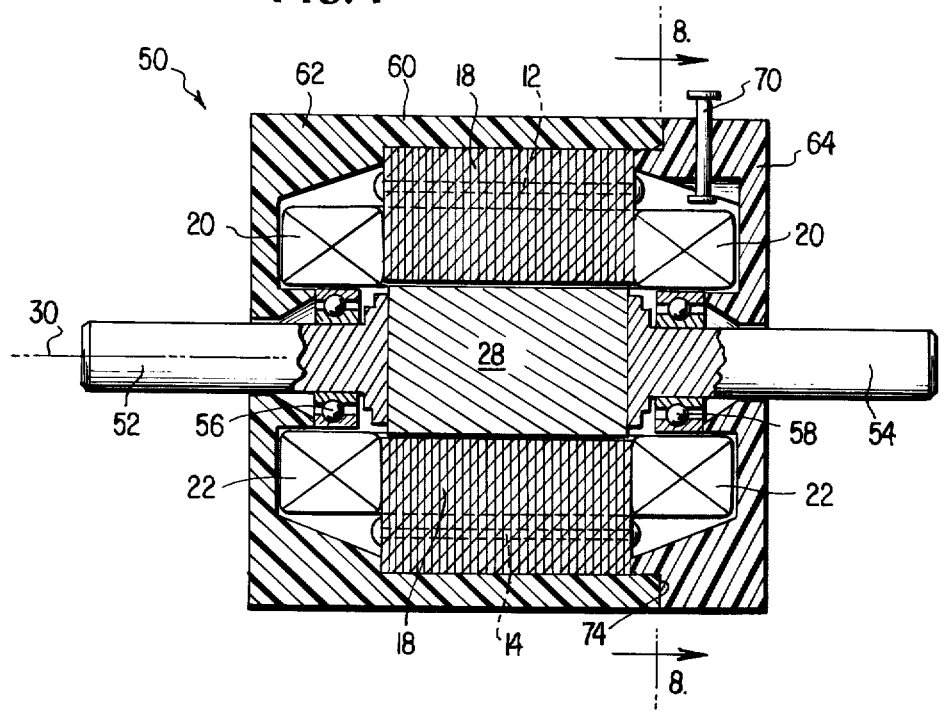
FIG. 7 is a cross-section through a complete generator or alternator constructed in accordance with this invention.

FIG. 7 is a cross-section through a completely assembled alternator or generator constructed in accordance with this invention and generally indicated at 50. Like parts bear like reference numerals in FIG. 7. As shown, permanent magnet 28 is secured to a pair of stub shafts 52 and 54 rotatable about axis 30. By way of example only, stub shafts 52 and 54 may be adhesively secured by epoxy to the opposite ends of permanent magnet 28. The shafts are rotatable in the respective ball bearings 56 and 58.

Figure 7A:
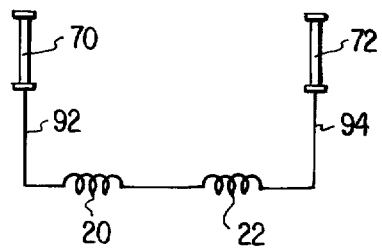
FIG. 7A shows the series connection of the two electrical coils or windings of the device.

The housing 60 in FIG. 7 is of two-piece construction and comprises a cup 62 joined to a cover or cap 64. Both the housing elements are centrally apertured to pass the stub shafts 52 and 54 and they each mount the respective bearings 56 and 58. Passing through the upper side of cap 64 are a pair of electrical terminals or pins 70 and 72 from which the electrical output voltage is derived from the device. FIG. 7A shows the connection of the two coils 20 and 22 in series between terminals 70 and 72. By way of example only, the cup 62 and cap 64 may be made from a suitable insulating plastic sold under the trade name DELRIN by DuPont. The cup and cap are permanently joined at their juncture as indicated at 74 by ultrasonic welding or the like.

Figure 8:
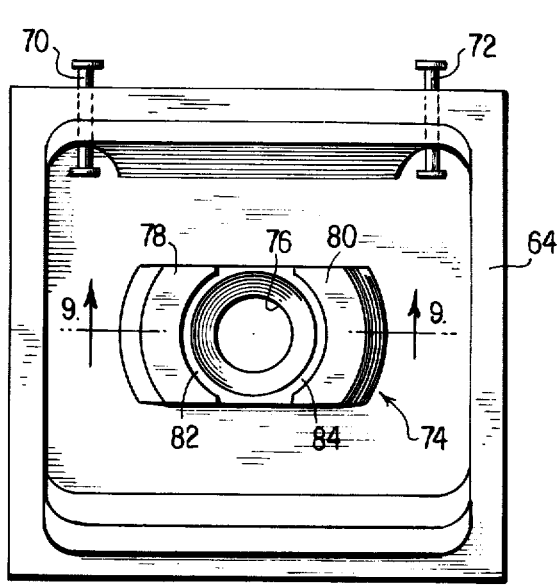
FIG. 8 is a cross-section taken along line 8—8 of FIG. 7 showing the housing cap or cover configuration.

FIG. 8 is a cross-section taken along line 8—8 of FIG. 7 and shows the interior of the cover or cap 64. The bearing is omitted from FIG. 8 for the sake of clarity but the bearing support structure is generally indicated at 74.

Figure 9:
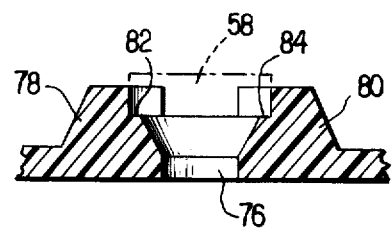
FIG. 9 is a cross-section taken along line 9—9 of FIG. 8 showing the cap or cover bearing support.

FIG. 9 is a cross-section taken along line 9—9 of FIG. 8 through the bearing mount. Cap 64 includes a central aperture 76 which passes the stub shaft 54. A pair of projections or bosses 78 and 80 formed integral with cap 64 are located on opposite sides of the aperture and these are cut away to provide ledges 82 and 84 upon which the ball bearing 58, shown in dashed lines in FIG. 9, rests. The bearing is preferably simply snapped inbetween the bosses and retained by the inherent resiliency of the plastic material of the cap 64 but if desired may be secured to the cap by a suitable adhesive such as epoxy or the like. The bosses 78 and 80 are of generally semi-cylindrical construction but are cut away at top and bottom to provide clearance for the coils 20 and 22. It is understood that the mount for the other ball bearing 56 in cup 62 is of identical construction and bearing 56 is similarly attached to the base of cup 62.

Figure 10:
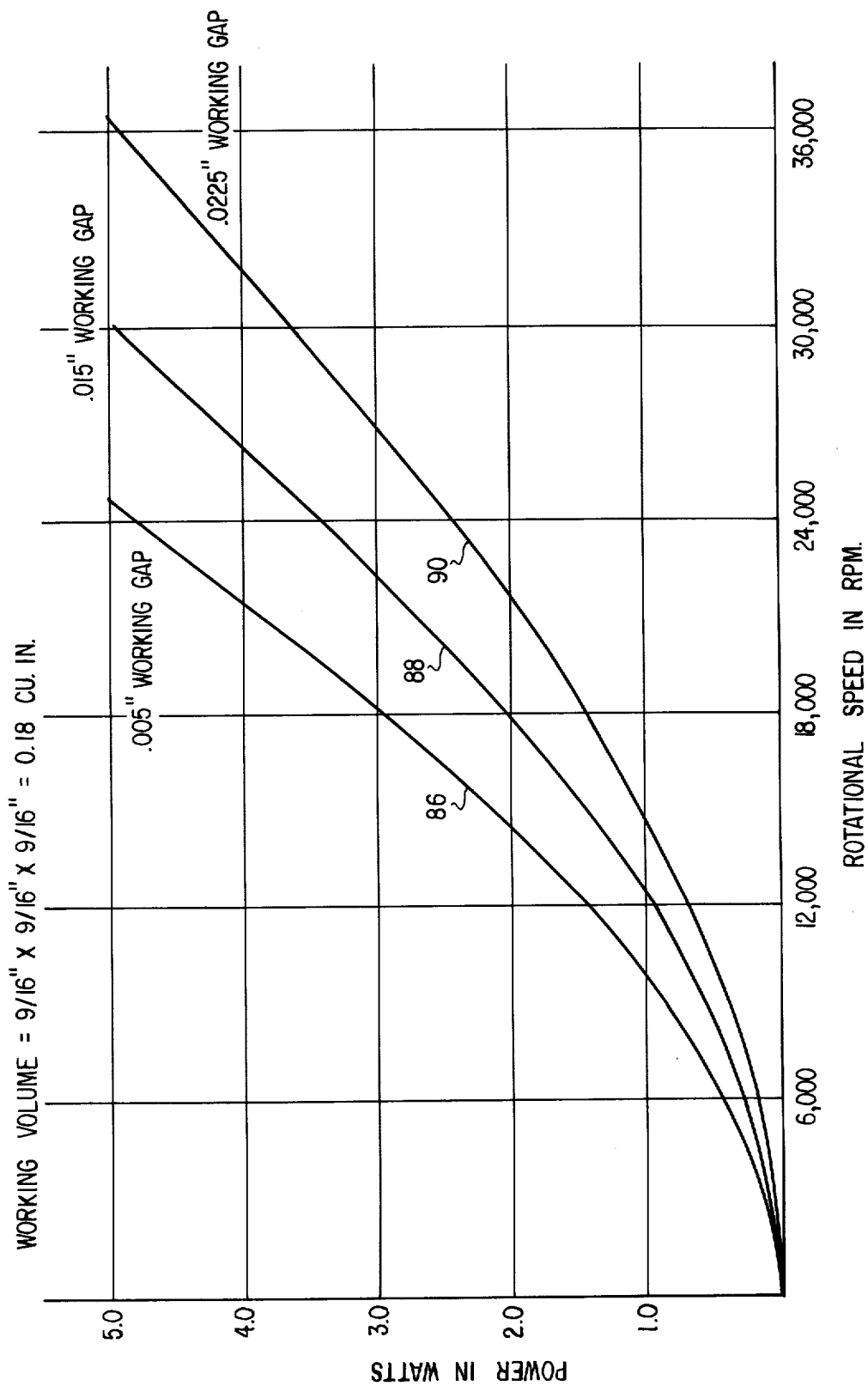
FIG. 10 is a plot of power output in watts for the device of FIG. 7 as a function of rotor rotational speed in R.P.M. for different working gaps.

FIG. 10 is a plot of electrical power output at terminals 70 and 72 in watts as a function of rotational speed of the stub shafts and permanent magnet 28 in revolutions per minute. Curve 86 is for a working gap of 0.005 inch, curve 88 in FIG. 10 is for a working gap of 0.15 inch and curve 90 is for a working gap of 0.0225 inch. The working gap is the radial distance between the outer surface of the curved portion of permanent magnet 28 and the adjacent curved surface of one of the core legs such as the curved surface 40 or 42 in FIG. 2. The embodiment of the invention illustrated in FIG. 7 from which the curves 86, 88 and 90 were derived, had a working volume of 9/16 inch × 9/16 inch × 9/16 inch or a working volume of 0.18 cubic inch. It can be seen from the curves in FIG. 10 that this very small working volume produces substantial electrical output of several watts at very reasonable rotational speeds.

Important features of the present invention include its very simple construction, the optimum advantage it takes of all available space, and the ease with which the various components of the device may be assembled. For example, referring to FIG. 7, the bearing 56 is first attached to the cup 62. The coils 20 and 22 are inserted over the legs of the laminated core 18 whose laminations are retained in a stack by the pins 12 and 14. The assembled laminations and coils are then inserted into the cup 62. Permanent magnet 28 with the two stub shafts attached are then inserted between the coils with the permanent magnet in the position as illustrated in FIG. 5 and as this is done, the stub shaft 52 slides through the ball bearing 56. Cap 64 is then slipped partway over stub shaft 54 with the stub shaft passing through ball bearing 58. With the cap partway along the stub shaft, electrical connection is made by flexible leads 92 and 94 from the coils 20 and 22 to the terminals 70 and 72 as illustrated in FIG. 7A. After this is done, the cap 64 is slipped fully over the stub shaft 54 into engagement with cup 62 and the two elements of the housing are permanently joined by ultrasonic welding of the plastic or by adhesive as desired. The ultrasonic welding provides a unitary permanently joined housing assembly. It is apparent from the above that the present invention provides an improved miniature generator which is useful for driving electrical speed sensing indicators, for driving all kinds of electrical sensing instruments and which may be used in military fuzing down to very small sizes. Because of the severe demagnetizing environment in which the permanent magnet 28 operates, the magnet must be formed from a material having a high coercive force or resistance to demagnetization. The reason for this is that the magnet is in a relatively severe demagnetizing environment (operating on a load line near unity or less) when the magnet is at the position in its rotation where the magnetic poles are in the open circuit condition, that is, when the direction of magnetization of the magnet is at 90 degrees to alignment with the core legs. Materials suitable for use in forming permanent magnet 28 are as a practical matter presently limited to the rare earth - cobalt materials having a coercive force ($H_c$) of at least about 6,000 oersteds. By way of example only, magnet 28 may be formed of rare earth - cobalt where the rare earth may be samarium, praseodymium, misch metal, cerium, lanthanium or neodymium, singly or in combination.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. An electromagnetic device for use as a generator or alternator comprising a plurality of magnetic laminations arranged to form a stack, each of said laminations being of at least substantially square configuration and formed as a single piece to reduce the magnetic reluctance of the lamination, each of said laminations having a pair of opposed legs with the legs of the laminations in said stack aligned to form a pair of opposed magnetic cores, a coil wound around each of said cores, the thickness of the coil around each core being at least approximately equal to the length of each core, and a permanent magnet rotor mounted for rotation between said cores, said rotor including a permanent magnet which is magnetized in a direction perpendicular to the rotational axis of said rotor, the spacing (A) between the tips of said cores being equal to the length (B) of the legs forming said cores which is in turn equal to the width (C) of said cores, and the width (D) of said frames being equal to at least approximately one-half the width (C) of said cores.

2. A device according to claim 1 wherein said coils are of rectangular cross section.

3. A device according to claim 1 wherein said permanent magnet has a coercive force (Hc) of at least approximately 6,000 eorsteds.

4. A device according to claim 3 wherein said permanent magnet is comprised of a rare earth - cobalt.

5. A device according to claim 3 wherein said permanent magnet is comprised of R-cobalt, where R is selected from the group consisting of samarium, praseodymium, misch metal, cerium, lanthanium, neodymium, and combinations thereof.

6. A device according to claim 1 wherein said permanent magnet is formed as a right circular cylinder.

7. A device according to claim 1 wherein said permanent magnet is formed as a portion of a right circular cylinder with flat parallel surfaces on opposite sides of the rotational axis of said rotor.

8. An electromagnetic device for use as a generator or alternator comprising a plurality of magnetic laminations stacked together, each of said laminations comprising a unitary and at least substantially square frame forming a low reluctance magnetic backpath for the lamination, each of said laminations having a pair of opposed integral legs with the legs of the laminations aligned to form a pair of opposed magnetic cores, a coil of at least substantially square cross section around each of said cores, said coils extending from said frames to the tips of the legs forming each core, and a permanent magnet rotor mounted for rotation between said cores, said magnet having a coercive force (Hc) of at least about 6,000 oersteds and being formed as a portion of a right circular cylinder centered about the rotational axis of said rotor, said magnet having a pair of parallel flat sides defining a thickness dimension for said magnet only slightly less than the distance between the tips of said cores, said magnet being magnetized in a direction parallel to said flat sides and perpendicular to the rotational axis of said rotor.

9. A device according to claim 8 wherein said laminations are electrically insulated from each other.

10. A device according to claim 8 wherein the spacing (A) between the tips of said cores is equal to the length (B) of the legs forming said cores which is in turn equal to the width (C) of said cores.

11. A device according to claim 10 wherein the width (D) of said frames is equal to at least approximately one-half the width (C) of said cores.

12. A device according to claim 8 wherein the length of said permanent magnet along said rotational axis is at least approximately equal to the overall thickness of the stacked laminates.

13. A device according to claim 8 wherein said rotor comprises said permanent magnet, and a pair of stub shafts secured to opposite ends of said magnet.

14. A device according to claim 8 including a housing surrounding said laminations.

15. A device according to claim 14 wherein said housing comprises a cup and cover, each of said cup and cover supporting a bearing for said rotor.

16. A device according to claim 15 wherein said cup and cover are made of plastic and sealed together.

17. A method of assembling a device for use as a generator or rotor comprising stacking a plurality of at least substantially rectangular and unitary laminations to form a pair of opposed magnetic cores, placing coils around said cores, providing a permanent magnet rotor having a first radial dimension greater than the distance between adjacent turns of said coils and a second radial dimension less than the distance between said coil turns, and inserting said rotor between said coils whereby said rotor may rotate into and out of the space surrounded by some of the turns of each coil.

18. A method according to claim 17 including inserting said laminations, coils and rotor into a cup shaped housing, and closing off the open end of said housing.

* * * * *